US007779210B2

(12) United States Patent
Pudipeddi et al.

(10) Patent No.: US 7,779,210 B2
(45) Date of Patent: Aug. 17, 2010

(54) AVOIDING SNOOP RESPONSE DEPENDENCY

(75) Inventors: Bharadwaj Pudipeddi, San Jose, CA (US); Ghassan Khadder, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 468 days.

(21) Appl. No.: 11/980,934

(22) Filed: Oct. 31, 2007

(65) Prior Publication Data

US 2009/0113139 A1 Apr. 30, 2009

(51) Int. Cl.
*G06F 12/00* (2006.01)
(52) U.S. Cl. .................. 711/146; 711/141; 711/145
(58) Field of Classification Search .................. None
See application file for complete search history.

(56) References Cited

U.S. PATENT DOCUMENTS 6,009,488 A 12/1999 Kavipurapu ................ 710/105
6,898,675 B1* 5/2005 Okpisz et al. ............... 711/141
2003/0200397 A1* 10/2003 McAllister et al. .......... 711/141
2008/0098177 A1* 4/2008 Guthrie et al. .............. 711/141
2008/0195820 A1* 8/2008 Lais et al. ................... 711/146
2009/0300289 A1* 12/2009 Kurts et al. ................. 711/133

OTHER PUBLICATIONS

Jack Doweck, "Inside Intel® Core™ Microarchitecture and Smart Memory Access," 2006, pp. 1-12.

* cited by examiner

*Primary Examiner*—Jack A Lane
(74) *Attorney, Agent, or Firm*—Trop, Pruner & Hu, P.C.

(57) ABSTRACT

In one embodiment, the present invention includes a method for receiving a request for data in a home agent of a system from a first agent, prefetching the data from a memory and accessing a directory entry to determine whether a copy of the data is cached in any system agent, and forwarding the data to the first agent without waiting for snoop responses from other system agents if the directory entry indicates that the data is not cached. Other embodiments are described and claimed.

14 Claims, 4 Drawing Sheets

AVOIDING SNOOP RESPONSE DEPENDENCY

BACKGROUND

Advanced computer systems are being developed with a point-to-point (PTP) interconnect technology between processors such as central processing units (CPUs) and between CPUs and other system agents such as an input/output (I/O) hub (IOH) for speed, performance and scalability.

For such systems that implement a source-snooping protocol, a requesting node (e.g., a processor node) that wants to have ownership of a cache line address needs to broadcast a snoop to all nodes in the system and collect all snoop responses before the cache line ownership can be granted to the requesting node. The snoop responses are collected by a so-called home agent that is the owner of the data. For a broadcast snoop, the home agent cannot send the data until all snoop responses are received. Some agents may have a relatively long snoop latency, which has a negative impact on performance, since cache line ownership cannot be decided until all snoops are received, therefore blocking other requests targeting the same cache line and blocking the request from being evicted to make room for a new request.

As the number of caching agents in a platform increases, the snoop latency starts to dominate over memory latency. This becomes the critical path in the load-to-use latency in a source-snooping protocol in the case when none of the peer agents have cached the line (and thus cannot forward the line), because the home agent has to wait until all snoop responses have been received before it knows that the line needs to be obtained from memory. In a non-fully interconnected system, the loaded snoop latencies can get very high because of the sheer number of snoops passing through shared links.

DETAILED DESCRIPTION

Embodiments may enable removal of the interdependency between snoop responses and load returns of data from a home agent. Since as many as 50-60% of all requests in certain use scenarios get their lines from memory, a significant savings can be realized by removing this dependency.

Embodiments may use a directory associated with the caching agents. While not limited in this regard, in some embodiments the directory may be implemented as 2-states per node to indicate whether a given cache line has been cached in a given node (e.g., if the line is cached the entry is in valid state, and is instead in an invalid state if the line is not cached). Note that this indication that the state of a given line for a node is "V", it does not necessarily mean that the line is currently cached in that node. For example, the line could have been prefetched by a node, then silently evicted and discarded. This is possible as long as the node does not modify the data. In this case, the directory will still indicate "V", yet the line is not cached in that node. The directory can be updated responsive to various incoming signals to the home node. For example, the directory can be updated by read/writeback requests, and snoop responses. A read request would transition the state to "V" state, and a writeback to memory invalidate message (WBMtoI) and a snoop response message that indicates presence of an invalid copy of the line in a given node (RspI) would transition it to "I" state.

When the home agent gets a request, it issues a prefetch to memory, reading both the cache line as well as the directory. If the directory indicates that the line is not cached anywhere, then the home agent returns the data alone to the caching agent using a data message type message (DataC_E) without waiting for the snoop responses, as the copy in the memory is the most updated copy. When all the snoop responses are received, the home agent sends a completion message (CMP) separately to de-allocate the transaction.

Figure 1:
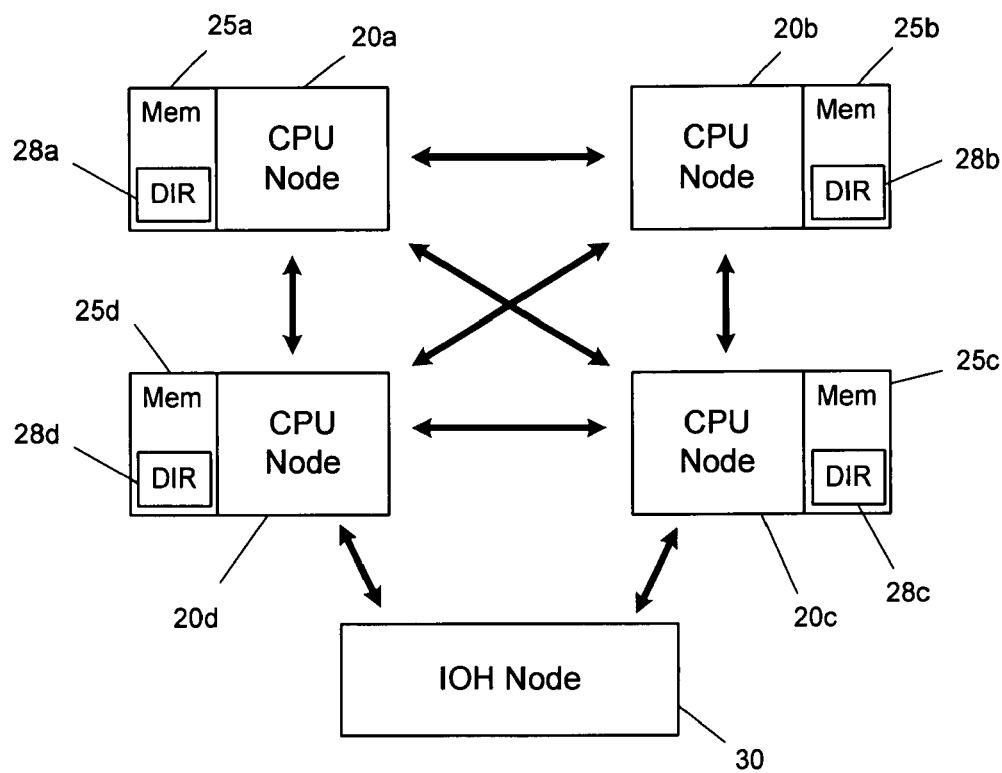
FIG. 1 is a block diagram of a system in accordance with one embodiment of the present invention.

While the scope of the present invention is not limited in this regard, various embodiments may be incorporated in a system implementing a point-to-point (PTP) interconnect system. Referring now to FIG. 1, shown is a block diagram of a system in accordance with one embodiment of the present invention. As shown in FIG. 1, system 10 includes a plurality of processor nodes, namely nodes 20a-20d (generically processor node 20), each of which is closely associated with a local portion of main memory, such as a dynamic random access memory (DRAM), namely memory 25a-25d (generically memory 25). As such, each node 20 can act as a home agent for its associated local memory 25. Furthermore, each memory 25 may store a corresponding directory 28a-d (generically directory 28), each of which includes a plurality of entries each associated with a line in memory 20. Each entry may have a field for entry system node (that can potentially be a caching agent), where each field may be of a first or second state (i.e., valid or invalid). Of course, at least a portion of the directory may be cached in the corresponding node 20, e.g., in a translation lookaside buffer (TLB) or other such structure. In various embodiments, each processor node 20 may include a memory controller integrated within it to interface with the corresponding memory. As shown in FIG. 1, each node is coupled to other nodes by one of a plurality of PTP interconnects. Furthermore, note that I/O hub node 30 is coupled by PTP interconnects to processor nodes 20c and 20d.

Assume a source processor Node B broadcasts a snoop request to all nodes. Node H is a Home node that owns the requested cache line data. It needs to wait for all snoop responses before it can grant cache line ownership to node B. In a four node system node H would typically have to wait for a snoop response from the other three nodes before it can return the data response to Node B and grant Node B the cache line ownership, which can negatively impact performance.

Figure 2:
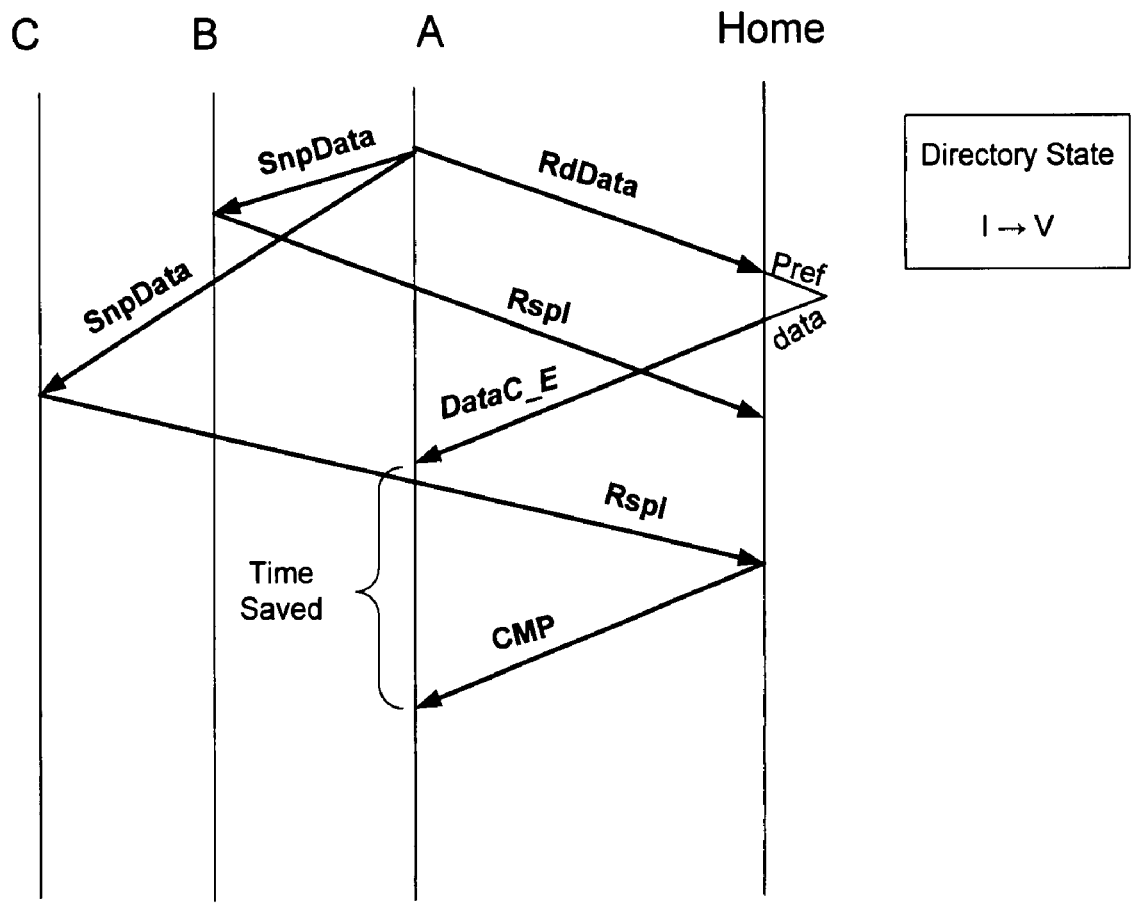
FIG. 2 is a timing diagram of operations of a system in accordance with one embodiment of the present invention.

However, using an embodiment of the present invention, the snoop protocol may be modified to send the data prior to receipt of all snoop responses, based on analysis of the corresponding directory entry. An example of how a transaction is handled when the snoop latency is longer than the memory latency is shown in FIG. 2. As shown in the timing diagram of FIG. 2, four agents are present, namely agents A, B and C, which may correspond to processor nodes or other system agents. In addition, a home agent is present. The home agent may be a processor node or other system agent that is owner of a particular memory region of interest (i.e., the home agent may be coupled to a local portion of main memory including one or more lines of interest). Note that the home agent may also be the same as agent B. As shown in FIG. 2, agent A desires to read data present in the memory associated with the home agent and accordingly sends a read data signal (Rd- Data). At the same time, agent A sends snoop requests (Snp-Data) to the other system agents, namely agents B and C. As shown in FIG. 2, when the home agent receives the read data request, it will perform a prefetch of the data as well as lookup of a state of the requested line in its directory. If the directory state indicates that no agents are caching a copy of the line (i.e., the directory entry is in the I state) the home agent will immediately return the data as soon as it is ready to agent A with a DataC_E message (and change the directory state for the agent A to valid). Upon receipt of the snoop responses (RspI) from the other agents B and C, the home agent will send a completion message (CMP) so that the request may be properly deallocated. Note that in the embodiment of FIG. 2, a substantial time savings may be realized, as the data is obtained in agent A at receipt of the DataC_E message, rather than at the later receipt of the CMP message.

Note that a conflict case of an implicit-forward-to-snoop conflict may be avoided because this protocol only operates when no agent has cached the line, however, there is one exceptional case that the home agent may resolve. Specifically, the home agent may choose to forward data to the first requestor whose request arrives at the home agent, and not necessarily the first requestor whose snoop responses complete. So, the home agent has to order the current owner in the response queue ahead of the second requester, in a manner similar to the implicit-forward-to-snoop conflict case.

Figure 3:
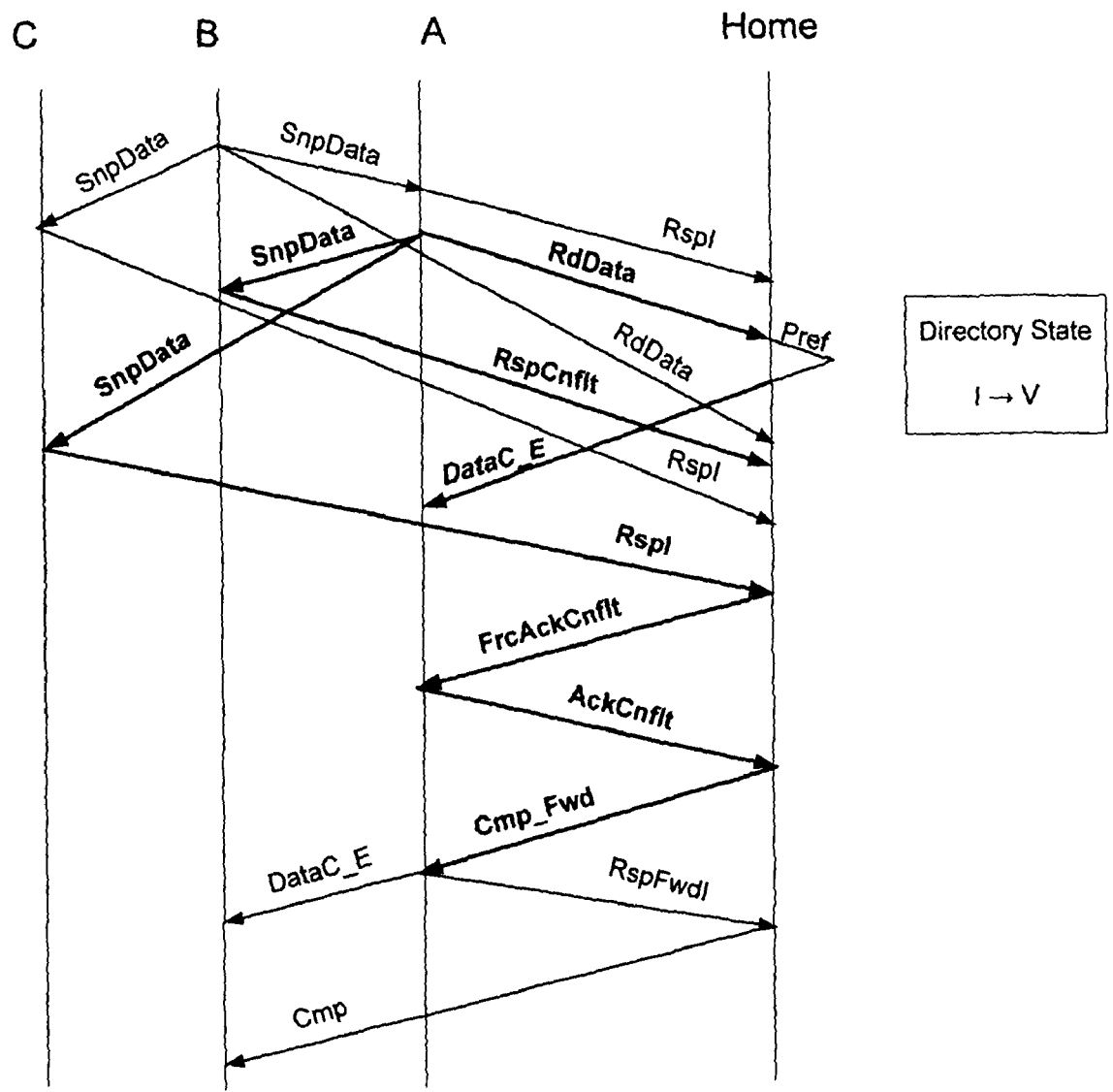
FIG. 3 is a timing diagram of operations of a system in accordance with another embodiment of the present invention.

Referring now to FIG. 3, shown is a timing diagram in which two system agents, namely agents A and B both request data, and issue snoop requests responsive to these read requests. As shown in FIG. 3, the request from agent A reaches the home agent first, but its snoop responses arrive later than the snoop responses for agent B's snoop request. Assuming that the prefetch performed responsive to the read request from agent A indicates that the associated cache line is not cached in any system agent, the home agent will provide the data with a DataC_E message, which occurs prior to receipt of the read request from agent B (and the indication of a snoop conflict RspCnflt also received from agent B). Thus as shown at the dashed line, although all responses for B's snoop request are received at this time, the home agent cannot complete the transaction by providing the data to agent B, as the current owner of the requested cache line is agent A.

Accordingly, the home agent waits for snoop responses from agent A to arrive before it forces a conflict acknowledgement (FrcAckCnflt) phase on agent A. In response to this message from the home agent, agent A sends an acknowledgement conflict (AckCnflt). Then the home agent will send a completion forward (CmpFwd) to agent A to cause it to send the data to agent B, and the home agent will finally send a completion responsive to agent B's request upon receipt of the response of the forwarding message (RspFwdI) received from agent A. While shown with this particular implementation in the embodiment of FIG. 3, understand the scope of the present invention is not limited in this regard.

Embodiments may save many wasted cycles waiting for unnecessary snoop responses (when the line is not cached in peer agents). In this way, snoop-loading latencies which can exceed memory latency by several hundreds of nanoseconds because of queue waiting delays due to lack of bandwidth can be avoided. Embodiments thus combine both the advantages of source-snooping (requiring only 2 hops for cache-to-cache transfer from a peer agent) and directory-snooping (to avoid waiting on snoop responses when the line is not cached). Accordingly, requests do not have to wait for snoop responses (assuming the data is not cancelled) in the source-snooping protocol by implementing a directory.

Figure 4:
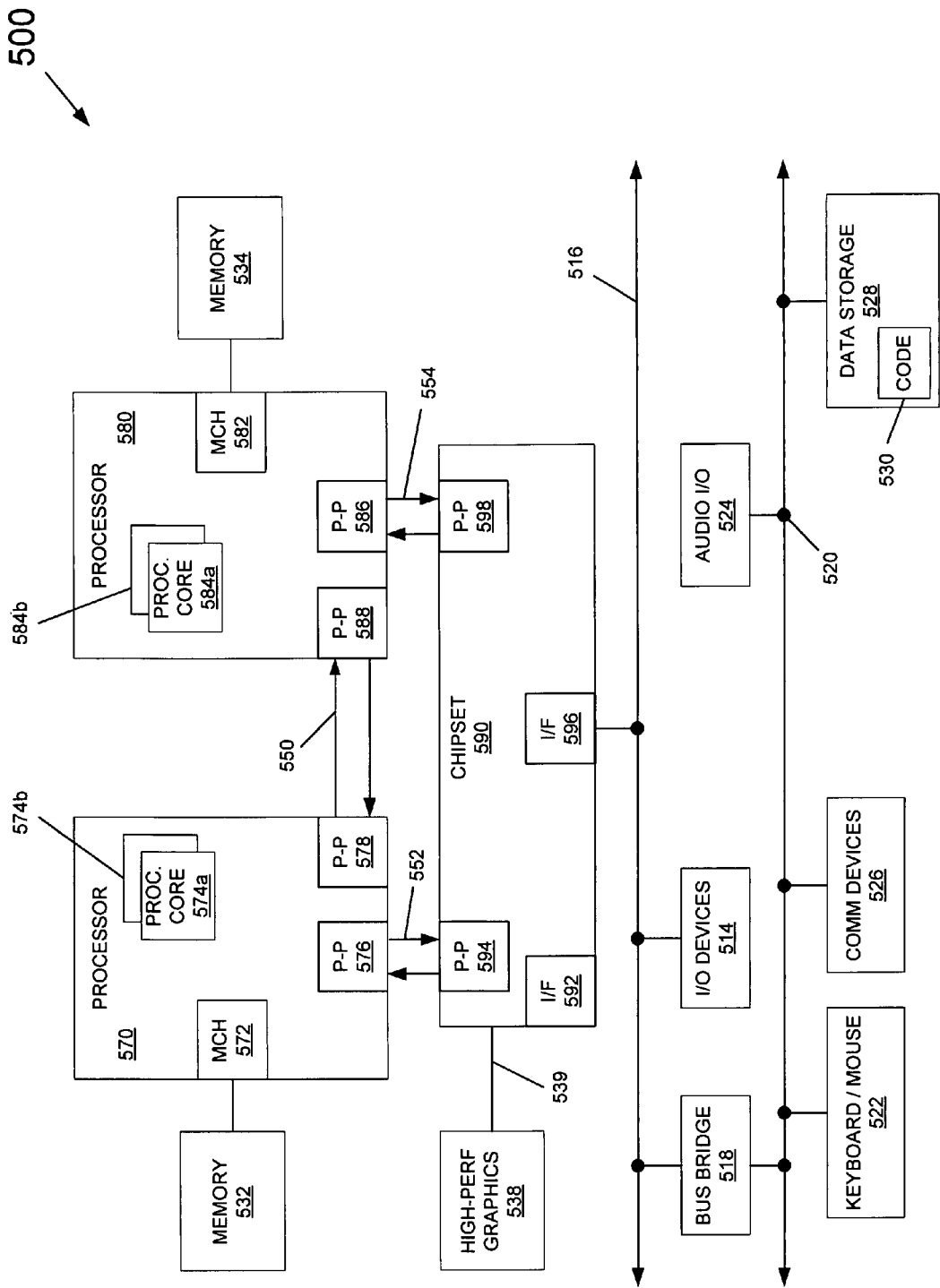
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b).

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors. Memories 532 and 534 may each store a directory in accordance with an embodiment of the present invention, and at least a cached portion thereof may be present within first and second processors 570 and 580. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 4, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    receiving a request for data in a home agent of a system from a first agent;
    prefetching the data from a memory associated with the home agent and accessing a directory entry associated with the data, the directory entry to indicate whether a copy of the data may be cached in any system agent; and forwarding the data from the home agent to the first agent with a first message and without waiting for snoop responses from other system agents that received a snoop request for the data from the first agent, if the directory entry indicates that the data is not cached.

2. The method of claim 1, further comprising receiving snoop responses in the home agent from the other system agents and transmitting a completion message to the first agent.

3. The method of claim 2, further comprising forwarding the data from the home agent to the first agent after waiting for the snoop responses if the directory entry indicates that the data may be cached.

4. The method of claim 1, further comprising updating to a first state the directory entry responsive to a read request for the data from a system agent, wherein the system implements a source-snooping protocol, the first state to indicate that the data is cached in the system agent.

5. The method of claim 4, further comprising updating to a second state the directory entry responsive to a writeback request for the data or a snoop response that indicates that the sender does not have a copy of the corresponding data, to indicate that the data is not cached in the sender.

6. The method of claim 1, further comprising:
receiving a second request for the data in the home agent from a second agent after forwarding the data to the first agent such that the first agent is the current owner of the data;
receiving snoop responses associated with the first agent snoop request in the home agent; and
sending a conflict message to the first agent, wherein the conflict message is to cause the first agent to forward the data to the second agent.

7. The method of claim 6, further comprising sending a completion message from the home agent to the second agent responsive to receipt of an indication from the first agent that the data was forwarded to the second agent.

8. A system comprising:
a home agent coupled to a plurality of system agents and to a memory, wherein the home agent is to receive a request for data from a first system agent, prefetch the data from the memory and access a directory entry associated with the data, the directory entry to indicate whether a copy of the data may be cached in any system agent, and forward the data to the first system agent with a first message and without waiting for snoop responses from other system agents that received a snoop request for the data from the first system agent, if the directory entry indicates that the data is not cached; and
the memory coupled to the home agent, wherein the memory includes a directory including a plurality of directory entries, each of the directory entries associated with a cache line and each including a plurality of fields each associated with one of the system agents to indicate whether the corresponding system agent may include a copy of the cache line.

9. The system of claim 8, wherein the home agent is to receive the snoop responses from the other system agents and transmit a completion message to the first system agent.

10. The system of claim 9, wherein the home agent is to forward the data from the home agent to the first system agent after waiting for the snoop responses if the directory entry indicates that the data may be cached.

11. The system of claim 8, wherein the memory is to update the directory entry to a first state responsive to a read request for the data from one of the system agents and to a second state responsive to a writeback request for the data or a snoop response that indicates that the sender does not have a copy of the corresponding data.

12. The system of claim 8, wherein a cache coherency protocol of the system combines source-snooping and directory snooping.

13. The system of claim 8, wherein the home agent is to receive a second request for the data from a second system agent after forwarding the data to the first system agent such that the first system agent is the current owner of the data, receive snoop responses associated with the first system agent snoop request, and send a conflict message to the first system agent, wherein the conflict message is to cause the first system agent to forward the data to the second system agent.

14. The system of claim 13, wherein the home agent is to send a completion message to the second system agent responsive to receipt of an indication from the first system agent that the data was forwarded to the second system agent.

* * * * *